United States Patent [19]

Kaiser

[11] E Re. 29,472

[45] Reissued Nov. 15, 1977

[54] CONDUIT SYSTEM FOR CONVEYING FIBROUS STOCK FROM DEAERATOR CHAMBER TO HEADBOX IN PAPERMAKING MACHINE

[75] Inventor: Robert G. Kaiser, Seminole, Fla.

[73] Assignee: Clark & Vicario Corporation, St. Petersburg, Fla.

[21] Appl. No.: 686,580

[22] Filed: May 14, 1976

Related U.S. Patent Documents

Reissue of:

[64] Patent No.: 3,812,007
Issued: May 21, 1974
Appl. No.: 184,839
Filed: Sept. 29, 1971

U.S. Applications:

[63] Continuation-in-part of Ser. No. 813,646, April 4, 1969, abandoned.

[51] Int. Cl.[2] ..... B01D 19/00; D21F 1/06

[52] U.S. Cl. ..... 162/343; 55/55; 162/336; 162/380; 209/211; 251/61.1

[58] Field of Search ..... 162/343, 336, 380, 216; 209/211; 55/55; 251/61.1

[56] References Cited

U.S. PATENT DOCUMENTS

| | | | |
|---|---|---|---|
| 2,571,219 | 10/1951 | De Cew | 55/55 X |
| 2,913,147 | 11/1959 | Johnson et al. | 251/61.1 X |
| 3,266,974 | 8/1966 | Staver, Jr. | 162/343 X |
| 3,328,237 | 6/1967 | Notbohm | 162/343 |
| 3,432,036 | 3/1969 | Kaiser | 209/211 |
| 3,486,972 | 12/1969 | Nagell | 162/343 |
| 3,538,680 | 11/1970 | Kaiser | 209/211 X |
| 3,539,447 | 11/1970 | Springuel et al. | 162/336 |

*Primary Examiner*—Richard V. Fisher
*Attorney, Agent, or Firm*—Watson, Leavenworth, Kelton & Taggart

[57] ABSTRACT

Papermaking apparatus in which deaerated papermaking stock is gravity fed from the evacuated chamber of a stock receiver to paper web-forming means through dropleg supply conduit system interconnecting the bottom of this chamber and the exit slot or slice of paper web-forming headbox, the dropleg conduit system having entry communication with the receiver chamber along a substantial part of a major lateral expanse of the bottom portion of the deaerated stock collecting zone thereof, the droplet conduit system preferably having exit communication with the delivery passage of the paper web-forming headbox transversely in the direction of the transverse length of the exit slice. The conduit system is provided such that its flow course between the stock receiver and the web-forming headbox delivery passage has no course deviation laterally of the web-forming means axis. The dropleg conduit system may be provided in the form of a plurality of closely spaced parallel arranged pipes, the entry ends thereof being connected to the chamber collecting zone and the exit ends thereof being connected to the delivery passage. The dropleg conduit system also may be provided as a single, relatively wide chute having its passage connected by an elongated slot extending along a substantial portion of a major lateral expanse of the bottom of the chamber collecting zone. Various forms of flow control valves may be embodied in the dropleg supply conduit system to restrict selectively their effective size for correspondingly regulating the rate of flow of the deaerated stock to the paper web-forming headbox in accordance with the demand for the particular grade of paper being made.

17 Claims, 18 Drawing Figures

CONDUIT SYSTEM FOR CONVEYING FIBROUS STOCK FROM DEAERATOR CHAMBER TO HEADBOX IN PAPERMAKING MACHINE

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of [pending] application Ser. No. 813,646 filed Apr. 4, 1969, now abandoned.

BACKGROUND OF THE INVENTION

The present invention relates to improvements in papermaking systems and particularly the apparatus employed therein for transferring deaerated papermaking stock from a collecting zone of an evacuated chamber defined by a stock receiver to the paper web-forming means.

Modern methods of papermaking often take advantage of the benefits of employing deaerated papermaking stock suspension as the furnish to the headbox of the papermaking machine or other point of use. Deaeration may be accomplished by atomizing the stock suspension into an enclosed receiver which is maintained under deaerating vacuum. The stock may also be cleaned in centrifugal solids separating means, such as hydrocyclones or other forms of cleaners, and such separating means may advantageously be combined with the deaeration means whereby the dirt-poor or accepts fraction from the separating means is sprayed directly into the evacuated receiver. Plural stages of cleaning may be employed and the accepts fraction from all or some of the cleaning stages subsequent to the primary stage may similarly be deaerated. A more complete description of method and apparatus for deaerating and for cleaning may be found in U.S. Pats. 1,853,849, 2,571,219, 2,614,656, 2,642,950, 2,685,937, 2,717,536, 2,751,031, 2,876,860, 2,931,503, 3,131,117, 3,206,917, Kaiser U.S. Ser. No. 417,161 filed Dec. 9, 1964, now U.S. Pat. 3,432,036, Kaiser U.S. Ser. No. 526,256 filed Feb. 9. 1966, now abandoned, and Kaiser U.S. Ser. No. 694,494 filed Dec. 29, 1967, now U.S. Pat. 3,538,680.

In papermaking systems employing deaerated papermaking stock, the deaerated stock commonly is delivered from an evacuated stock receiver to the paper web-forming means by single relatively small supply conduit means and fan pump or like impeller means connecting the receiver with the headbox of the web-forming means, as shown, e.g., in the Kaiser et al. U.S. Pat. 3,206,917. The supply conduit means are connected to the bottom portion of the collecting zone of the stock receiver at a central location, and the communicating outlet from this zone to the supply conduit occupies but a very small fraction of the lateral expanse of the bottom portion of the collecting zone. At the outlet end of the supply conduit, the papermaking stock is delivered to a manifold for supplying the stock to the headbox of the web-forming means, the manifold extending laterally to both sides of the supply conduit in order to attempt to attain even distribution of the stock along the expanse of the slice in the headbox from whence issues the stream of effluent ribbon of stock cast, for example, onto the traveling wire of a Fourdrinier unit. The conveyance of stock from the stock receiver to the web-forming means headbox in such type of conduit thus involves undesirable alterations in the conduit flow course in a direction laterally of the web-forming means axis particularly in effecting flow course transition from the conduit to outlet at the back of the web-forming means headbox. Further, the passage of the deaerated stock from the receiver to the headbox in a relatively small artery which demands that there be a relatively high flow velocity that may require relatively high pump pressure in order to maintain the transfer flow of a predetermined rate. Certain system operating problems may attend this mode of supplying deaerated stock to the web-forming means, including floccing or coagulation of stock fibers and like stock particles on internal conduit surfaces such as valve closure members, elbows, etc., as well as cavitation at points where flow pressure drops, such as at locations wherein conduit passage size is diminished with concomitant increase in velocity of flow, especially at the papermaker's valve. Cavitation-promoting conditions are desirably eliminated from the system since cavitation, especially at the papermaker's valve, can introduce a marked unevenness of flow to the web-forming means and adverse effect upon the quality and uniformity of paper formed on the wire or other forming means. Also, the magnitude of the pressure drop often causes vibration and shaking of the papermaker's valve and associated parts of the system, which vibration also imparts non-uniformity to the product as well as causing wear and damage to the system structure.

Certain papermaking system improvements have been proposed to minimize the above-described drawbacks in prior art papermaking systems. For example, Kaiser U.S. patent application Ser. No. 526,256, filed Feb. 9, 1966, now abandoned, discloses an improved papermaking system wherein the transfer of papermaking stock from the stock receiver to the headbox of the paper web-forming means is effected by gravity, thus eliminating the need for the conventional stock transfer pump with consequent effective reduction of cavitation as a system shortcoming as well as improvement in flow conditions to and at the paper web-forming means. The desirable end of reducing cavitation as well as improving the consistency and quality of furnish supplied to the web-forming means with the provision of a greater degree of constancy of pressure within the supply conduit is achieved by elevating the stock receiver a height above the delivery slot or slice of the web-forming means that provides a hydrostatic head between the elevation of the surface of the deaerated papermaking stock in the receiver and the elevation of the web-forming level of the paper forming means in excess of that necessary to offset the condition or degree of vacuum within the stock receiver deaerating chamber plus all of the intervening hydraulic losses associated with the supply conduit, papermaker's valve, etc., the overall vertical distance between these two elevations being measured in terms of a dropleg of certain height.

SUMMARY OF THE INVENTION

The present invention is concerned generally with improvements in papermaking systems and specifically with improvements in the supply conduit means by which deaerated papermaking stock is transferred from the collecting zone of an evacuated stock receiver chamber wherein the stock may suitably have been deaerated, to the paper web-forming means. It is a feature of the invention that the supply conduit means connected with the stock receiver in air-excluding relationship have entry thereto in communication with the chamber defined by the stock receiver, and particularly a stock collecting zone thereof along a substantial portion of a major lateral expanse of the collecting zone bottom portion, with exit flow from the supply conduit means preferably being provided along a relatively wide course extending transversely of the delivery passage of the web-forming means, such as a headbox structure thereof. In this manner most direct transfer of the papermaking stock between the indicated entrance and exit locations is achieved, with the transfer being effected by elevating the stock receiver a sufficient distance above the web-forming level to eliminate the need for a pump unit.

By withdrawing the deaerated stock from the receiver chamber collecting zone along a substantial portion of a major lateral expanse of the bottom thereof there is obtained a desirable degree of uniformity of suspension of the fibrous solids in the deaerated supply stock fed to the web-forming means by the present improved dropleg supply conduit means. The present demand of an increase in the rate of production of the paper requires papermaking apparatus of larger capacity to provide the necessary increase in the rate of flow of deaerated stock supplied to the speeded-up web-forming means. Since certain problems impose limitations upon provisions for increasing the flow velocity of the supplied stock through supply conduits of prior design, the greater capacity of embodiments of the present dropleg supply conduit means is an important advantage realized by the use thereof. Providing large capacity flow courses for the supplied stock by certain forms of the present invention also permits flow to the exit slice through the delivery passage leading thereto with minimum tendency to create undesired turbulence. Where the delivery passage to the web-forming means is a headbox structure, the present invention provides for more uniform introduction of stock transversely across the back expanse of the headbox. This is not always possible when prior art conduit means are employed and deliver stock to a central location at first entry to the headbox from whence it must be conveyed laterally within manifold means for distribution across the expanse of the headbox. Moreover, uniform introduction and distribution with prior art conduit means is particularly difficult to achieve where the flow rate is varied over a wide range of values.

Advantages of the improvement of the present invention may be realized by providing the supply conduit means in a form comprising a plurality or bank of separate dropleg pipes having their upper ends connected in air-excluding manner to the bottom of the receiver which defines the bottom portion of the collecting zone of the interior evacuated chamber for communication to the collecting zone, and in a pattern of distribution that arranges them along a substantial portion of a major lateral expanse of the bottom of this zone, such conduit means being characterized further by the feature that the flow course provided thereby does not undergo between entry thereto and exit therefrom, any course alteration in a direction laterally of the axis of the web-forming means, i.e., the papermaking machine axis. In the event that the collecting zone is in the form of an elongated or longitudinal, lateral or substantially horizontal and generally cylindrical receiver chamber, or a transverse section thereof, its bottom portion may be in the form of an elongated trough, and such pattern of distribution of communications to the passages of the bank of pipes may be in a closely spaced array extending longitudinally of the trough, the pipes being arranged parallel with each other. This bottom portion may include an elongated, rectangular well or recess intervening the top ends of the dropleg supply pipes and the major cylindrical area of the chamber with the space therein forming a lower section of the chamber bottom portion. The communications of the supply pipe passages to the chamber collecting zone, or such a well thereof, may also be arranged along sinuous or zig-zag lines, or in parallel rows to attain the desired expanse of distribution. If the section of the evacuated receiver chamber which constitutes the collecting zone is substantially square or rectangular in plan view the communications of the supply pipe passages thereto, or to a well section thereof, may be arranged in a variety of patterns at any convenient location below the level of stock therein, such as along one or both diagonals of the square, or in rows, or along margins of progressively smaller squares with inner ones thereof enclosed in outer ones, or in random arrangement. In the event that the receiver stands upright the lower end section may constitute the collecting zone and the pattern of distribution of the communicating openings may be diametrical, or radial, or arranged in coaxial circles, etc., in the event that the transverse section of the receiver is generally circular, the flow course provided by the supply pipe passages being as indicated such that there is no flow course deviation therein laterally of the papermaking machine axis. It will thus be seen that a large variety of patterns of distribution of the communicating openings which connect the passages of the dropleg supply conduit pipes to the evacuated collecting zone will satisfy the requirement of arrangement along a substantial portion of a major lateral expanse of the bottom of this zone.

The lower exit ends of such a plurality or bank of supply conduit pipes have their passages connected in air-excluding manner to a delivery passage leading to the web-forming means exit slot or slice. This delivery passage may be defined by a suitable transition sleeve, which may be rectangular in transverse section, or it may be in the form of a section of the interior of a suitable headbox, and the like. While it may be preferred that the exit openings of the lower ends of the dropleg supply pipes be arranged in an aligned array directed toward the exit slice, such as by means of a curved transition sleeve defining the intervening delivery passage, with the length of such array approaching the transverse length of the slice, it is to be understood that such lower exit ends may be clustered together with, for example, the clustered ends connected to the top of the chamber of suitable headbox structure, in which case suitable provision will be made to avoid development within the headbox chamber of an undesirable degree of turbulence.

According to the present invention, the dropleg supply conduit means also may be provided as a single, relatively wide, dropleg chute, such as one of rectangular cross-section or other appropriate configuration, having its top end connected in air-excluding manner to the bottom of the receiver for communication to the collecting zone of the entry end of its flow course or passage through the bottom of the receiver by an elongated slot which extends along a substantial part of a major lateral expanse of the collecting zone bottom portion. The lower exit end of this chute is connected in air-excluding manner to the means defining the delivery passage which leads to the exit slot or slice, preferably with the exit end of the chute passage being arranged with its transverse width extending in the direction of or substantially parallel to the transverse length of the exit slice and communicating herewith. A lower end section of the chute may be shaped to serve as a transition structure for defining the delivery passage for smoothly turning the direction of flow from a downward direction to a lateral path for direct feed to the exit slice. In a preferred embodiment, the dropleg chute has uniform width from its entry to its exit ends, such width further preferably being equal to the width of the outlet slice of the headbox at the web-forming means.

While it may be preferred to orient or suspend the dropleg supply chute substantially vertically it is to be understood that it may extend obliquely down from connection to the receiver bottom, such as along a line which is offset a minor transverse distance from a vertical plane through the receiver axis, to approach at an acute angle the lateral plane of exit flow from the slice, thereby reducing the required degree of turning of the flow through the delivery passage. If desired, the connection of the receiver bottom to the top of the oblique chute may be effected substantially in the vertical axial plane of the receiver through a smoothly curved transition section.

The supply conduit means provided by the present invention also may be used with the deaerating chambers disclosed in U.S. Pat. 3,538,680 for conveying stock from such deaerating chambers to the paper web-forming means. The conduit means can, for example, comprise a plurality of parallel spaced pipes having entry connection thereto at the deaerating chambers and outlet at the back of the paper web-forming means headbox.

Suitable flow regulating means, functioning as the papermaker's valve, may be associated with or provided in the supply conduit means, and it may be in the form of a plurality of separate valves each associated with one of the separate pipes in the case where the supply conduit means comprises a plurality or bank of separate [dopleg] *dropleg* pipes, and as a single flow regulating device or control valve in a system utilizing a single enlarged dropleg chute. In accordance with the invention, the specific forms of flow regulating or control valve means can vary and can include butterfly-type valves separately located in the dropleg pipes, either interconnected to operate together in tandem or ganged unison or with these valves being individually operated by suitable means. The purpose of the flow regulating means is to vary the rate of flow of deaerated stock to the paper web-forming means, which may be attained either by altering the size of the supply conduit means passage at some desired point, such as by suitable adjustable valve means, or by diverting some of the flow through this passage to recycle or to another point of use for reducing the rate of delivery of deaerated stock to the web-forming means. Thus the valving function or adjustment of the degree of flow blocking action may be performed by any suitable means of establishing a barrier of variable area of confrontation to flow in the dropleg supply conduit means, to serve as a papermaker's valve.

For example, the dropleg supply conduit, or each separate pipe of the dropleg bank of pipes, may include a tubular section in which is mounted an elongated, inflatable, elastic sleeve sealed at its opposite end to longitudinally-spaced portions of the inner surface or wall of the tubular section so as to define an intervening circumscribing or annular chamber between the elastic sleeve and the tubular section intermediate the sealed ends of the sleeve, with the interior of the sleeve serving as the through flow passage. By introducing a pressurized fluid into the annular chamber intervening the tubular section and the elastic sleeve the latter may be distended, i.e., bulged inwardly intermediate its sealed ends, for decreasing the available flow area of its interior passage through which the deaerated papermaking stock can pass. This action constitutes a pinching of the through flow passage. Such pinch valve is opened up by withdrawing or venting pressurized fluid from the chamber thereof.

In a system where a single chute is employed as supply conduit means, a special form of valve means preferably is provided. Such valve means preferably includes an elongated, selectively expandable and contractable bladder arranged within the conduit passage transversely of the direction of flow therethrough, which may be in the form of an open-ended sleeve that is transversely distortable in shape and having its end in unconstrained, conformable and sliding abutment with the inner side surfaces of opposed walls of the conduit. A feed pipe may extend through one or more walls of the conduit to the interior of or through the bladder for connecting the interior of the bladder through one or more vents in the feed pipe with a source of fluid under pressure. The introduction and withdrawal of pressurized fluid to the bladder selectively varies the area of confrontation of the barrier the bladder offers to flow in the conduit, i.e., its flow blocking action, thereby selectively regulating stock flow through the conduit.

The flow regulating means which is associated with the supply conduit means may be of a type which determines the rate of delivery from the latter by diverting or bypassing therefrom a quantity of the otherwise normal flow therethrough. For example, each conduit structure, such as each dropleg supply pipe of the bank thereof which together serve as the supply conduit means in one embodiment, may be equipped with such a flow diverting device that includes a lower end section of the pipe. This lower end section is of certain cross-sectional area to determine the unit capacity thereof. A feed conduit for supplying deaerated stock to the delivery passage leading to the exit slot or slice has its passage communicated to the passage of the pipe lower end section through an opening of a cross-sectional area lesser than that of the passage of the pipe lower end section at a certain point or elevation. Therebelow, a flow diverting or bypass conduit that has a passage of lesser capacity than that of the passage through the lower end pipe section has its passage connected to the latter, and the feed conduit and bypass passages constitute together the sole outlets from the lower end pipe section. Thus, some of the flow through the dropleg supply pipe will be caused to flow into the feed conduit and the rate of this latter flow will be determined by the rate of flow permitted in the bypass conduit. The latter may be determined by the size of the opening which serves as the entry end to the bypass conduit passage or by flow regulating means associated with the bypass conduit, such as an adjustable valve mounted in the latter. The bypass conduit may feed the flow diverted thereby either to a return line connected directly to the means for introducing the stock into the receiver chamber or to the white water collecting pit of the web-forming means, and this may be accomplished selectively by suitable valving equipment.

DESCRIPTION OF THE DRAWINGS

Other objects of the invention will in part be obvious and will in part appear from the following detailed description taken in connection with the accompanying drawings, wherein like numerals identify similar parts throughout, and in which.

DESCRIPTION OF ILLUSTRATIVE EMBODIMENTS

The present invention is concerned with improvements in papermaking systems and especially the manner and means employed in said systems for effecting transfer of deaerated stock from the stock receiver as furnish to the paper web-forming means. The following description relates to a system employing a Fourdrinier unit as the paper web-forming means, although it should be understood that the improvements of the present invention have broader utility including, but not [limited] *limited* to, use in papermaking systems that employ other paper web-forming means, such as multiple wire units, cylindrical units, vertical forming machines and the like.

Figure 1:
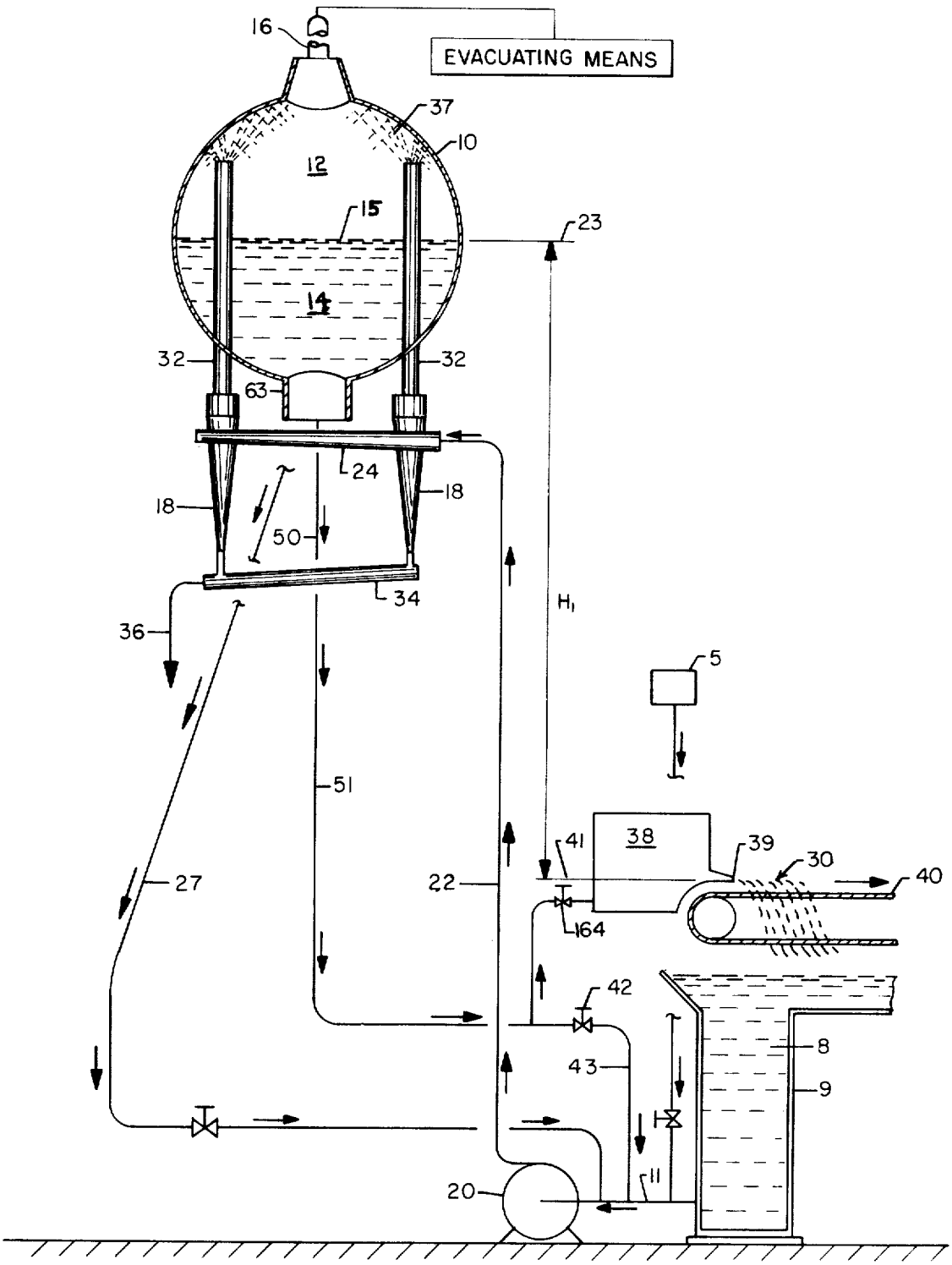
FIG. 1 is a schematic representation, with parts in section and broken away, of improved papermaking apparatus constructed in accordance with the principles of the present invention.

A system embodying the improvements of the present invention is depicted schematically in FIG. 1 and includes a papermaking stock receiver 10, suitably an elongated, hollow and securely closed structure of suitable size and shape, which is described and illustrated herein, by way of example, as being of generally cylindrical shape. Other receiver configurations, including those shown in U.S. Pat. 3,538,680 may be employed. The receiver structure 10 defines an enclosed chamber 12 into which is introduced liquid, papermaking fibers which are treated in the chamber to remove absorbed, adsorbed, entrained and dissolved air from the fibers and other constituents of the fibers and liquid, the latter commonly being water. The chamber 12 or a collecting zone thereof may also serve to accumulate a body or pond 14 of the deaerated papermaking stock, the surface 15 of the pond of stock so accumulated being maintained in the chamber at an essentially constant predetermined level 23 for an important purpose described later, by known means, preferably the means described in the Kaiser et al. U.S. Pat. 3,206,917, including the transverse weir mounted in the lower portion of the receiver chamber that is illustrated and described therein. The interior of stock receiver 10, i.e., chamber 12, is connected by conduit or pipe means 16 located at the top thereof with an evacuating means [(not shown)] for maintaining the chamber under a condition of vacuum sufficient to deaerate air-containing, aqueous papermaking stock introduced into this chamber.

Introduction of air-containing stock into the receiver 10 can be made as an adjunct of a cleaning procedure for which various cleaner devices of known construction can be employed, solids separating means in the form of hydrocyclones 18 and described in the Samson et al. U.S. Pat. 2,377,524 being preferred. The air-containing stock is delivered by means of pump 20 through conduit 22 to inlet headers 24 to which the hydrocyclones 18 or other suitable [stock-introucing] *stock-introducing* means are connected, the system sources from which the air-containing stock is withdrawn including a stuff box 5 or other suitable source of fresh thick stock. The air-containing stock may be diluted prior to its delivery to the hydrocyclones 18 by admixing white water therewith, and the source of the white water suitably may be body 8 thereof in wire pit 9 associated with the web-forming means 30, which may be drawn off through conduit 11 connected to the intake of pump 20, and this conduit may also serve to supply stock from stuff box 5 to this pump. The air-containing stock delivered to each hydrocyclone 18 is separated therein in the manner described, e.g., in U.S. Pat. 2,377,524 into a dirt-poor or accepts portion which exits the hydrocyclone through an inlet pipe 32, entering as an atomized spray into the receiver chamber 12, and a dirt-rich or rejects portion discharged from the apex of each hydrocyclone to a rejects header 34 from whence the rejects are passed to a point of further use in the system, the rejects header being maintained under evacuated condition. Reuse of the rejects, for example, may include returning them by means of conduit 36 to a subsequent cleaning stage, e.g., in the manner disclosed in the Kaiser U.S. Pat. 3,432,036.

As will be noted, the hydrocyclones 18 and their exit pipes 32 can be connected at the stock receiver in various arrangements as, for example, in two groups located symmetrically on opposite sides of the stock receiver longitudinal axis, in the manner shown in FIG. 1. The accepts entering the top portion of the chamber 12 are readily deaerated therein since the sprays of stock 37 impinge on the receiver inner surfaces above the stock pond surface 15, as shown, causing it to break up, thereby facilitating deaeration. The sprayed stock then falls down to accumulate in a collecting zone as the [pound] *pond* 14 in the manner shown, the level of the stock surface 15 being maintained at the elevation 23 as previously indicated. In connection with maintaining the stock surface level at elevation 23, the level control means employed for this purpose, such as weir 26 indicated in broken lines at 26 in FIG. 2, functions to return overflow stock to the suction side of pump 20 through dropleg conduit 27 since the stock receiver is elevated a certain height above the pump 20 in the manner described in Kaiser U.S. Pat. 3,432,036.

The deaerated stock accumulated in the pond 14 within the receiver chamber 12 is then transferred by means of gravity through suitable supply conduit means 50 provided in accordance with the present invention. One suitable arrangement of supply conduit means is that shown in detail in FIG. 2, and is comprised of a plurality or bank of separate dropleg pipes 52–62, preferably similar and of uniform size. As a preliminary to further specific description of the supply conduit means 50, a brief description of the employment of gravity as a transfer means may here be given to advantage. Gravity transfer is achieved by elevating the stock receiver 10 a distance ($H_1$) above the web-forming level 41 of the paper web-forming means 30, i.e., at the outlet slice 39 of its delivery passage or headbox 38, so that the supply conduit means 50 connecting the bottom of the deaerating chamber 12 and the headbox of the Fourdrinier unit constitutes a dropleg of sufficient height to overcome the effect of vacuum on the outflow of stock from the receiver and to offset all equipment pressure drops in the supply system, and additionally to provide the pressure or head of stock necessary for the desired rate of transfer of treated stock or furnish to and out of the slice of the headbox and onto the traveling wire 40 of the web-forming means at a velocity essentially the same as that of traveling wire 40. The advantages attending the use of such a dropleg in a papermaking system as a stock transfer means in place of a fan pump employed in most prior art systems include reduction of cavitation at the papermaker's valve, greater system flexibility and more consistent quality and uniformity of paper formed by the system, an improved system embodying such dropleg means being described in the identified U.S. patent application Ser. No. 526,256 of Feb. 9. 1966, now abandoned. *If desired and with reference to FIG. 1, a portion of the deaerated stock being delivered to the paper web-forming means can be bypassed through valve 42 and conduit 43 to the intake side of pump 20.*

Turning now to a consideration of the improved supply conduit means provided by the present invention, reference is again made to FIG. 2 of the drawings wherein it will be noted that the system stock receiver 10 is depicted, by way of example, as being of elongated cylindrical shape with its major axis disposed horizontally, although it should be understood that the stock receiver could have its major axis disposed vertically or at any angle from horizontal to vertical and it could have other shapes including elliptical, etc. The solids separating means or hydrocyclones 18 shown in FIG. 1 are not illustrated in FIG. 2 in order that the construction and manner in which the supply conduit means 50 is arranged can be shown with enhanced clarity, the employment of such separating means being optional although preferred. As mentioned above, the supply conduit means 50 is comprised of a plurality or bank of separate dropleg pipes 52–62 which depend in generally vertical disposition and have their open upper or entry ends 63 secured in air-excluding relationship to the bottom of the stock receiver 10 below the level of the pond therein, the pipes, for example, being arranged such that their entry ends are closely spaced with respect to each other in an array extending horizontally and longitudinally of the chamber 12 or along a substantial part of a major lateral expanse of the bottom of its collecting zone, thereby providing that entry communication of these pipes with the chamber collecting zone bottom portion is attained throughout a major part thereof. Thus the deaerated stock which is resident in pond 14 thereof is readily accessible to the entry ends of the pipes 52–62 below the level of the pond. It will be understood that the inlet pipes 32 well disperse the stock within the collecting zone of the chamber 12 to promote uniformity of the feed delivered to the web-forming means 30, and their locations in this chamber facilitates minimizing the exit course from the receiver 10. Hence entry communication to the supply conduit means occurs with but minimum lateral displacement of the papermaking stock from point of first entry to the ponding area of the chamber and the point at which it leaves when entering the pipes 52–62. The dropleg pipes 52–62 are preferably, but not necessarily, located directly below and in alignment with the central axis of the stock receiver. Thus, with this preferred arrangement of the droplet pipes 52–62, the hydrocyclones 18 are arranged at locations on each side of the receiver axis spaced therefrom in order to assure that a maximum number of these supply conduit pipes can be connected with the bottom of the receiver 10 without interference by the inlet pipes 32 of the hydrocyclones. The lower or outlet ends of the dropleg pipes 52–62 are connected in air-excluding relationship with the delivery passage or headbox of the web-forming means. The headbox 38 is intended to be of conventional construction, but it may include a sweeping transition piece 68 which is used to convey the deaerated stock to the slice 39 of the headbox from which it passes as a relatively wide stream or jet of stock onto the traveling wire 40 of the Fourdrinier unit, the plane of stock flow thereby being changed from essentially vertical to substantially horizontal. Such transition piece of course need not [to] *be* provided if the traveling wire or web-forming means traverses a vertically disposed web-forming path in which event the plane of the stock flow will be correspondingly a vertical one. Also it will be understood that if such web-forming path should traverse a plane intermediate the usual horizontal and vertical paths as are known, the transition piece would be modified accordingly to effect the change in flow path of the stock from the vertical to the web-forming path plane. The connection of the lower ends of the dropleg pipes 52–62 with the transition piece 68 is characterized by their lower exit ends being arranged in a closely spaced array extending transversely of the headbox 38.

As indicated earlier, the dropleg pipes 52–62 are adapted to convey the deaerated papermaking stock or furnish to the paper web-forming means under the influence of a dropleg in lieu of utilization of a fan-type pump in the conventional manner. For that purpose the dropleg pipes 52–62 are of sufficient height to enable location of the head of stock in the receiver 10 at an elevation ($H_1$), i.e., the vertical distance measured between the level 23 of the surface 15 of the stock accumulated in the collecting zone of the receiver chamber 12, as the pond 14 thereof, and the web-forming level 41 of the paper web-forming means 30. The height ($H_1$) is such as to provide a hydrostatic head sufficient to overcome the evacuated condition within the receiver chamber 12, plus that which will compensate for the hydraulic losses occurring in the dropleg pipes 52–62, the papermaker's valve means [64,] *164*, the headbox transition piece 68, and any other cause for hydraulic head loss. In a practical system installation, this height ($H_1$) can generally vary over a fairly wide range of heights, depending on the type of paper being made as well as the type of equipment with which the paper web is formed, as for example, certain cylindrical web-forming units require no effluent jet velocity, so hydrostatic compensation for this factor need not be provided.

Figure 2:
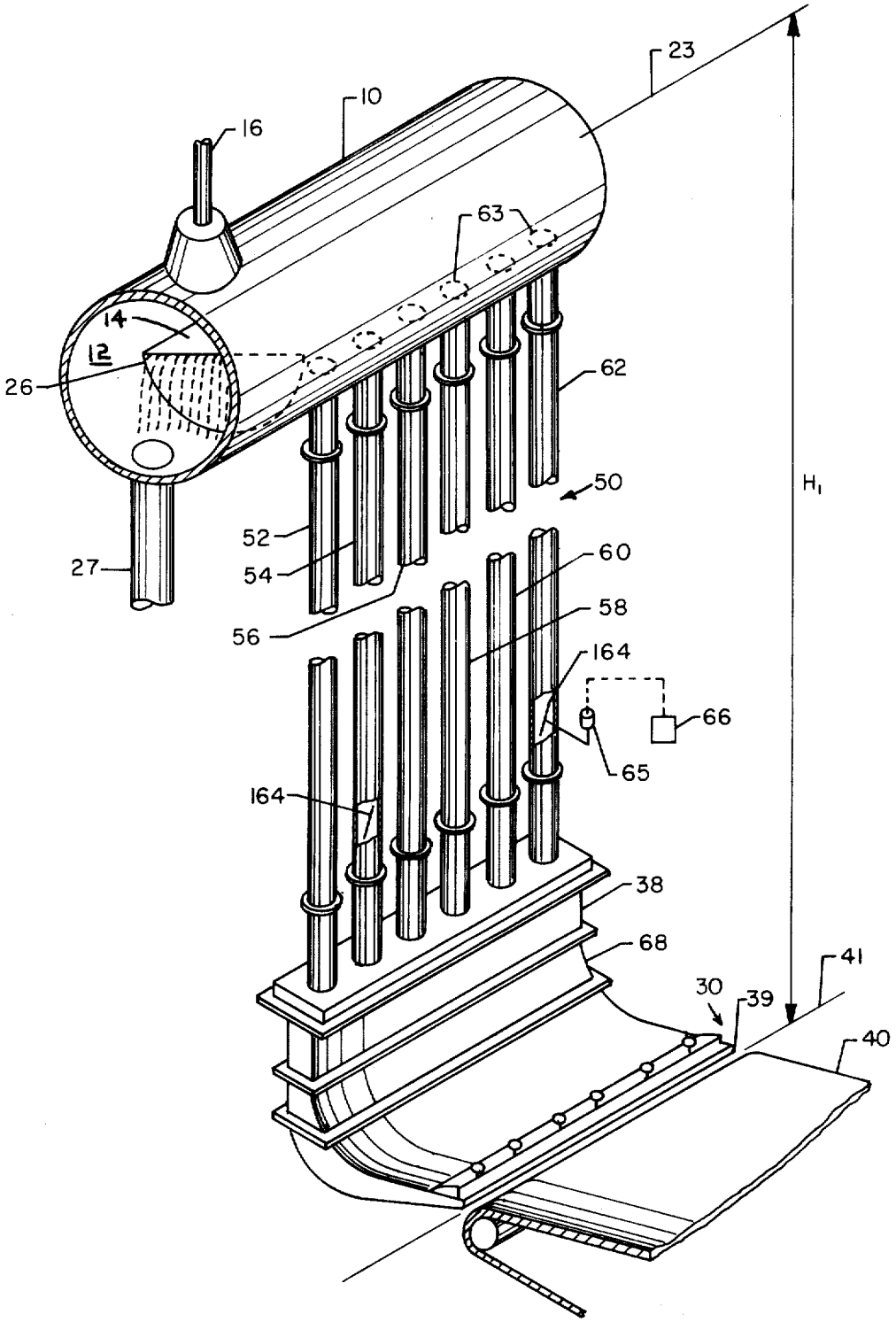
FIG. 2 is a perspective view to larger scale, with parts broken away, of a portion of the apparatus illustrated in FIG. 1, showing the manner in which a plurality of dropleg separate pipes together serve as the supply conduit means by which gravity transfer of stock from the receiver means to the web-forming means is effected, a portion of the receiver structure being shown in phantom for purposes of clarity.

The dropleg supply pipes 52–62 shown in FIG. 2 may be fitted with papermaker's valve means 164 of conventional construction, each being separately equipped with a butterfly-type of valve 164. These valves 164 can be individually controlled, or they may be operated in tandem by ganging them and providing a known type of actuating device 65 for varying the butterfly setting, the actuating device being controlled with a suitable controller indicated at 66. As previously indicated, a change in the grade of paper being made with the system is provided most readily by altering the flow rate of stock to the headbox 38. this is conventionally done, and as will be discerned with reference to FIG. 1, by changing the degree of closure of the papermaker's valve means [64] *164* in the supply dropleg conduit means 50.

Figure 3:
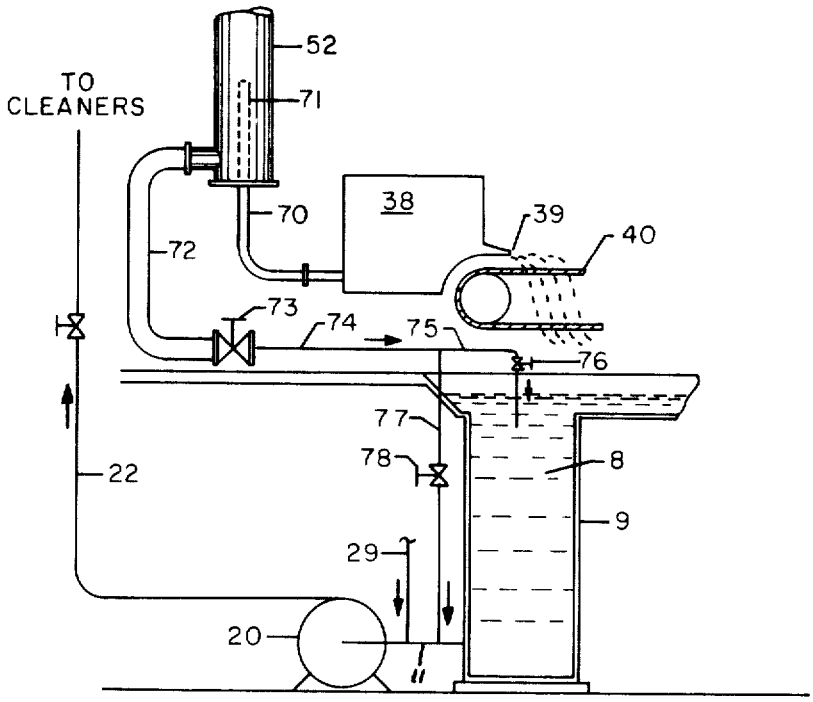
FIG. 3 is a partial elevational view of a lower portion of dropleg supply means similar to that shown in FIG. 2, and of associated structure, illustrating a flow diverting or bypass piping arrangement to serve as a flow regulating means with which the rate of stock feed to the web-forming means can be varied.

The present invention also provides improved forms of flow regulating means for use in conjunction with the improved supply conduit means 50 previously described. One form of improved flow regulating means is shown in FIG. 3, and it comprises a plurality of devices with each one thereof embodied in each of the separate dropleg pipes 52–62 shown in FIG. 2, each being substituted, for example, for one of the butterfly-type valves 164. The flow regulating procedure associated with this form of arrangement does not require physically positioning such flow regulating means within each of the dropleg pipes 52–62 thereby allowing uninterrupted flow through each pipe. Instead, it involves altering the flow rate by bypassing or diverting a portion of the papermaking stock feed or furnish flowing through each dropleg supply pipe 52–62 to a suitable point, such as the wire pit 8 wherein is collected the white water drawn from the Fourdrinier unit 30 during the web-forming operation *stock being introduced through conduit 29 connected to the intake side of pump 20.* For this purpose the lower end of each dropleg pipe 52–62 is terminated at a point short of the headbox 38 and, as is illustrated in FIG. 3 with respect to dropleg pipe 52 by way of example, this lower end is connected with the headbox by means of the lateral leg of a smaller diameter tubular elbow 70 having the open top end section 71 of its upright leg extending up through the closed bottom end of the dropleg pipe to an elevated point, as shown. A bypass or flow diversion tube 72 is communicated to the interior of this dropleg pipe (such as 52) at a location appreciably below the open top of the upright leg 71 of tubular elbow 70. The flow diversion tube 72 is connected through a valve 73 with a conduit 74 which in turn can selectively discharge to either the wire pit 9 through valved pipe 75, or through valved conduit 77 to the suction side of pump 20, depending on the settings of valves 76 and 78. The degree of closure of control valve 73 in the diversion tube 72 determines the rate of diverted flow through the latter either to the wire pit 9 or pump 20, and hence the rate of flow through the tubular elbow 70 connected with the headbox 38. A particular advantage of this arrangement is that it creates a mild turbulence in the lower end sections of the dropleg pipes 52–62 which enhances dispersion of fibers in the system at those locations. Further, it maintains nearly uniform flow velocity in the dropleg pipes with varying flow rates as demanded in elbow 70 by diverting unwanted or differences in flow through tube 72.

Figure 5:
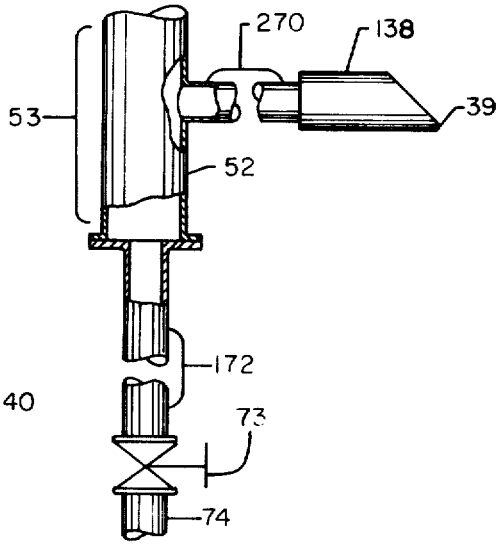
FIG. 5 is a partial elevational view, with parts broken away and in section, of a variation of the flow regulating means illustrated in FIG. 3 which may serve to regulate the rate of stock feed to the web-forming means.

The principles of operation of the flow regulating means illustrated in FIG. 3 may be embodied in a simplified form which does not require insertion of an upper end section 71 of the feed conduit 70 appreciably into the interior of the closed bottom end of the dropleg supply pipe. As is illustrated in FIG. 5 the interior of the headbox 138 may be connected by a feed conduit 270 by communicating the passsage of this feed conduit through the side wall of the lower end section 53 of the dropleg pipe 52 at an elevated point, such as that similar to the elevation of the open top end of the inserted section 71 of the feed conduit 70. The flow diverting bypass conduit 172 may then be connected directly to the closed bottom end of the bottom end section 53 of the dropleg pipe for communicating the passage of this bypass conduit to the passage of the bottom end section through an opening of lesser diameter. The resultant partial blocking of flow through the dropleg pipe as a fraction thereof enters the bypass conduit 172 thus assures flow of a fraction of the deaerated supply stock through the feed conduit 270 toward the exit slice 39. The degree of diverted flow through the bypass conduit 172 is subject to adjustment by suitable valve means such as valve 73. The diverted flow can be conveyed through conduit 74 to any suitable point of use such as the Fourdrinier wire pit.

Figure 4:
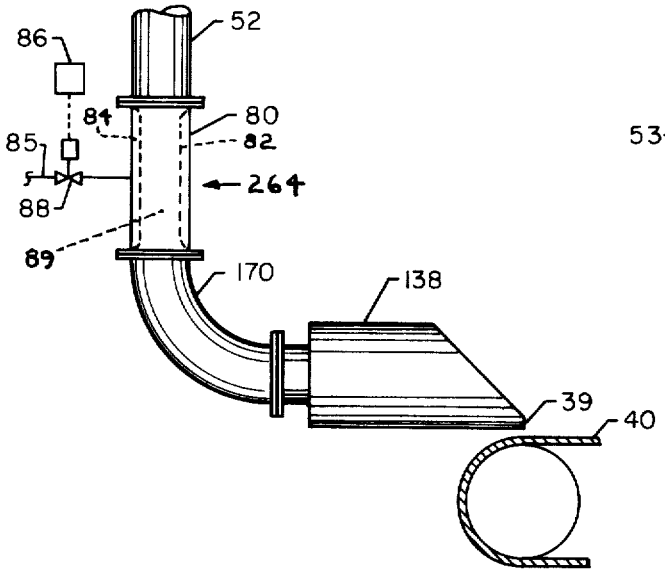
FIG. 4 is a fragmentary elevational view of another papermaker's valve arrangement with which stock feed to the web-forming means can be varied, the arrangement involving the use of distendable elastic sleeves within each supply pipe to vary the flow passage size.

Another form of improved papermaker's valve means is in the form of a plurality of individual valves, each inserted in one of the dropleg supply pipes 52–62, one of which is illustrated by way of example in FIG. 4 at 264. Each such valve 264 includes a connector sleeve 80 connecting the lower end of a particular one of the dropleg pipes 52–62, such as 52 there illustrated, to an elbow means 170 which communicates with the interior of headbox 138. Within the connector sleeve 80 of valve 264 is mounted a generally cylindrically-shaped or tubular, distendible or elastic sleeve 82 having its upper and lower ends annularly sealed to the inner surfaces of the connector sleeve at longitudinally spaced points to define between the intervening sections of these sleeves an annular chamber 84. A supply conduit, indicated in broken lines at 85, may connect a suitable source of pressurized fluid to the annular chamber 84 through any suitable flow control valve 88 through a controller 86, so as controllably to increase the capacity of this annular chamber with attendant adjusted constriction of the flow passage 89 through the elastic sleeve 82. Such controlled supply of pressurized fluid may be common to all of the valves 264, or individual like sources may be respectively associated with these valves for all of the dropleg supply pipes 52–62. The resulting variations of the sizes of the flow passages 89 through valves 264 causes corresponding variations in the stock flow rate through the dropleg pipe 52–62 to the headbox 138 and resulting variations in the rate of delivery of the stock from the headbox slice 39. A particular advantage of this form of valve 264 is the ease with which each thereof is operated to control rate of flow through the respective dropleg pipes 52–62 to the headbox 138.

Figure 13:
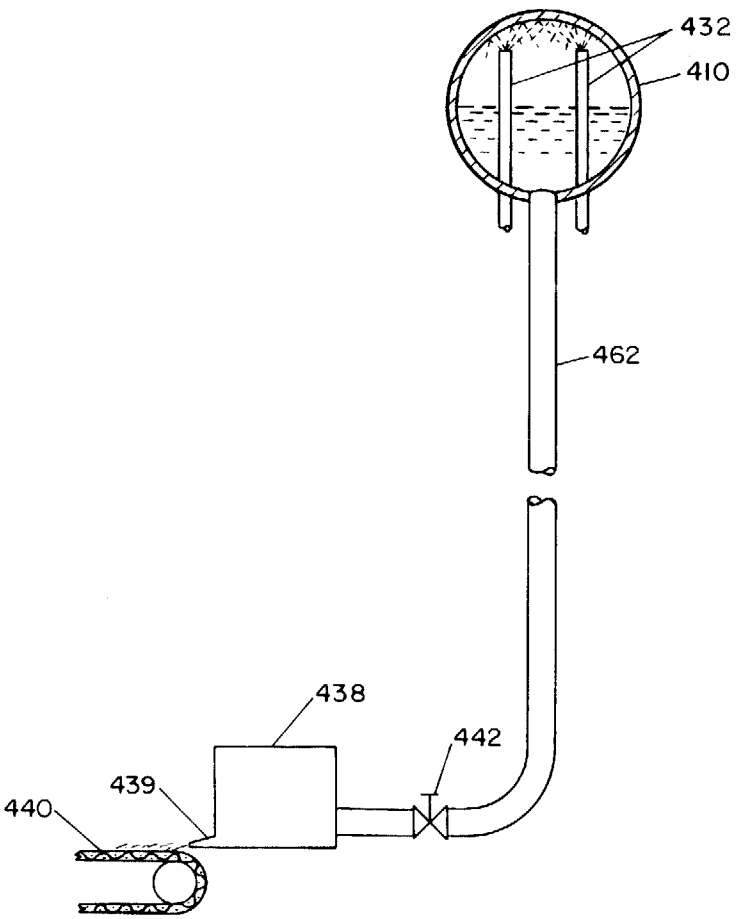
FIG. 13 is an end elevation looking from the right end of the apparatus depicted in FIG. 12.
Figure 12:
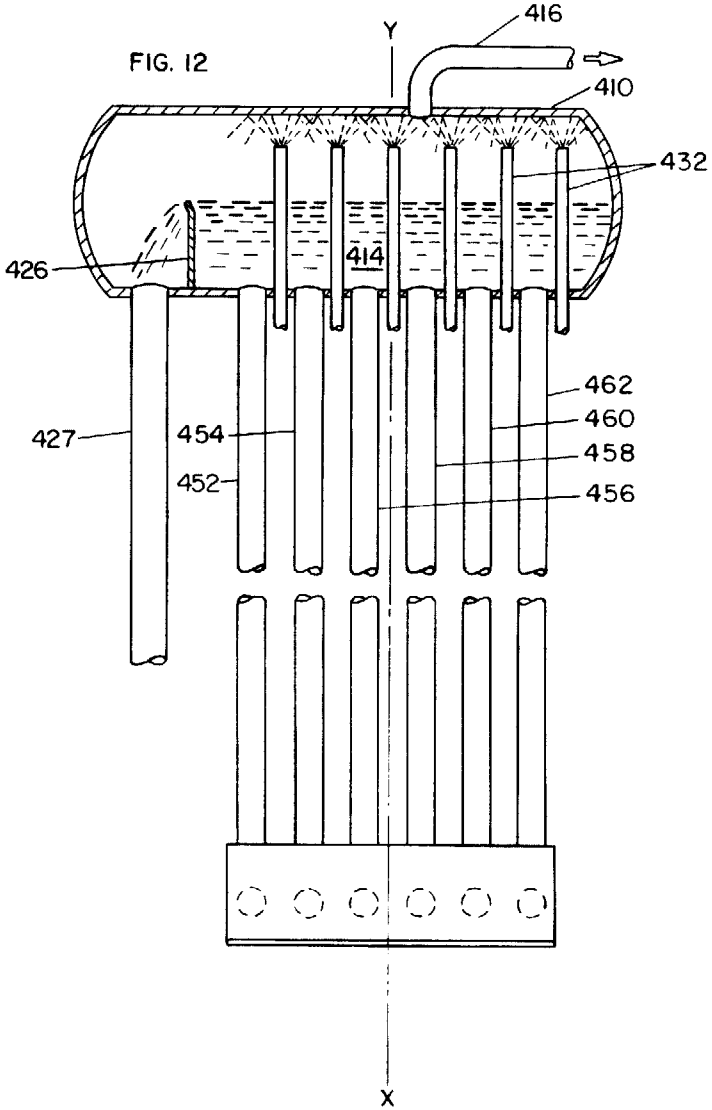
FIG. 12 is a front elevational view of the apparatus shown in FIG. 2 wherein a plurality of dropleg pipes are used for conveying stock from the receiver to the papermaking machine headbox, and as viewed from the direction of the papermaking machine axis.

A preferred form or conduit means comprised of an arrangement of dropleg pipes is depicted in FIGS. 12 and 13 of the drawings. Such apparatus is essentially the same as that earlier described in respect of FIG. 2 and includes a stock receiver 410 provided with suitable connection means 416 for evacuating the interior of the stock receiver as well as a level control in the form of a weir 426 for maintaining a pond 414 of stock in the receiver. Stock from a primary cleaning stage is atomizingly sprayed into the interior of the receiver through accepts pipes 432 in the same manner as earlier in connection with the apparatus shown in FIGS. 1 and 2. Certain constructional details of the apparatus have not been shown as the same are not necessary for complete understanding of the form of conduit means. Stock receiver 410 also has an overflow compartment to which stock overflowing weir 426 flows from whence stock is removed through dropleg conduit 427 and recycled to a cleaning stage. The droplet pipes 452–462 which connect the stock receiver 410 to the headbox 438 of the web-forming means are arranged in a closely spaced array extending longitudinally of the stock receiver and are parallel one with the others and parallel with the papermaking machine axis X–Y. In this manner, the dropleg pipes 452–462 provide flow courses for gravity transfer of stock from the receiver 410 to headbox 438 which flow courses between the entry and exit ends thereof have no flow course deviation therein laterally of the axis X–Y of the papermaking machine, the axis X–Y of the papermaking machine lying in a vertical plane passing centrally longitudinally through the Fourdrinier wire 440. In consequence, stock can be conveyed from the stock receiver 410 to the web-forming means 440 without any undesirable lateral displacement of the stock in respect of the machine axis thereby avoiding settlement of fibers from the suspension as well as such other undesirable flow conditions which result from flow course alterations lateral to the machine axis and as are commonplace in prior art constructions. Thus, there is provided uniformity of stock flow through each of the pipes 452–462, with consequential uniformity of distribution of stock flow out of the slice 439 of the headbox 438 onto the forming wire 440 with concomitant enhanced uniformity of the quality of paper formed on the wire 440, particularly in high speed papermaking machines. Like the apparatus earlier described, each of the dropleg pipes 452–462 may be provided with a papermaker's valve, as for example, the valve 442 disposed in the dropleg pipe 462.

Figure 15:
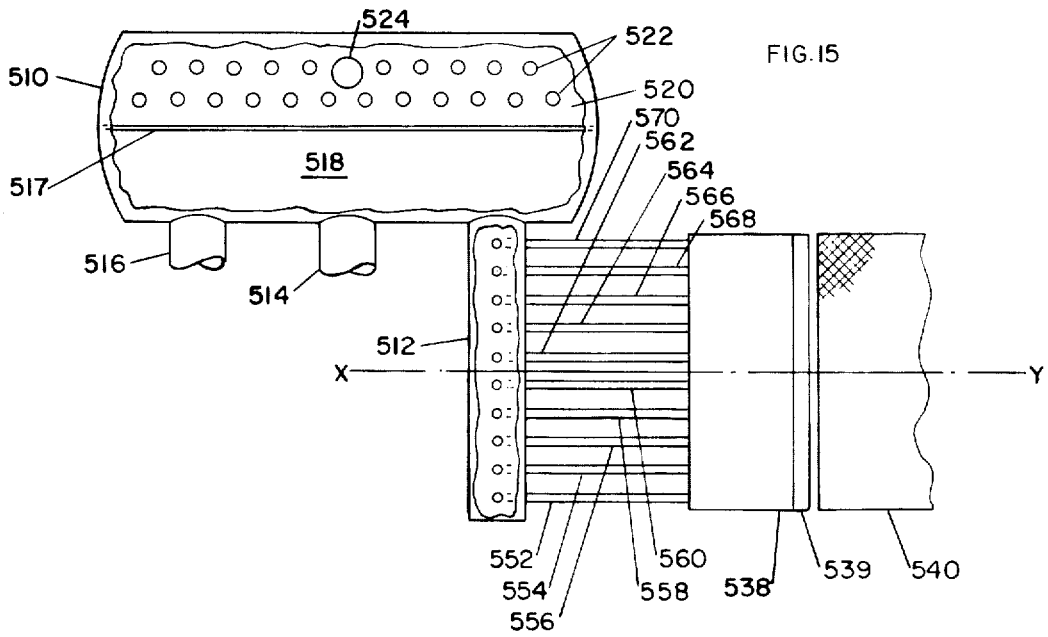
FIG. 15 is a plan view depicting the use of a plurality of dropleg pipes employed for conveying stock from a deaerating chamber of the type disclosed in U.S. Pat. 3,538,680, to the headbox of a papermaking machine.
Figure 16:
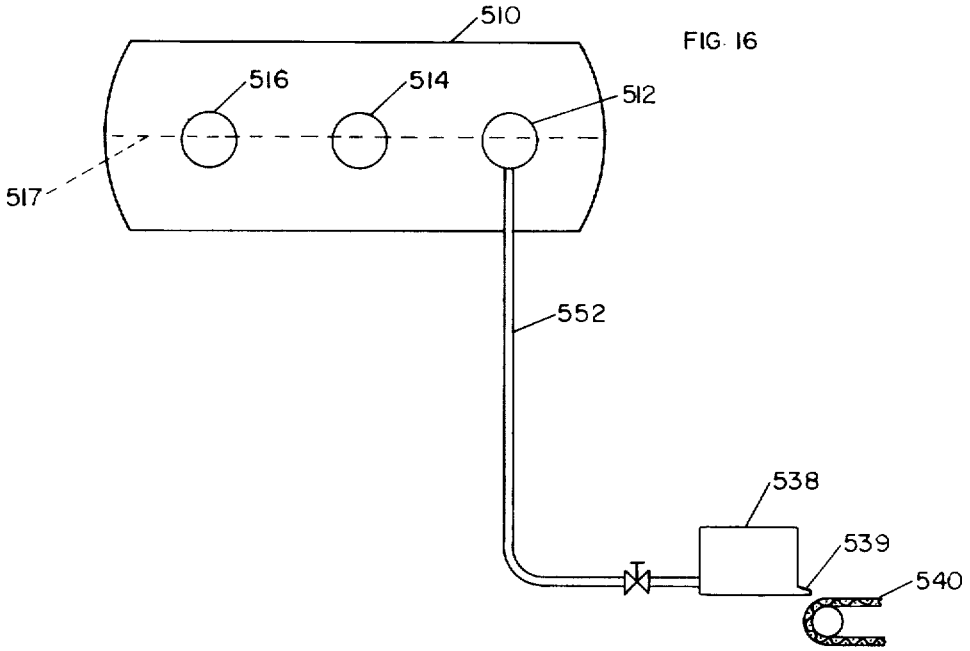
FIG. 16 is a side elevational view of FIG. 15.

FIGS. 15 and 16 depict a further form of apparatus which utilizes a dropleg conduit means according to the present invention for connecting the papermaking stock source with the paper web-forming means, the particular depicted embodiment being one employed in a system using deaerating chambers 512, 514, 516 in conjunction with a receiver 510 in the manner disclosed in U.S. Pat. 3,538,680. A longitudinally disposed overflow means such as a weir 517 extends along the length of the receiver 510 and divides it into a first compartment 518 wherein a pond of stock is confined, which pond extends also into each of the deaerating chambers. The second compartment 520 of the stock receiver provides an overflow chamber into which overflows from the pond in the first compartment flows in conjunction with maintenance of a constant pond level in the chamber 518 at a certain distance above the web-forming level of the papermaking machine. The second compartment 520 also can be used as a deaerating space for deaerating stock from a secondary stage or subsequent cleaning operations, which stock can be admitted to the receiver 510 through accepts pipes 522. Outflow from the compartment 520 is effected by way of a suitable dropleg conduit 524 through which stock is recycled to a cleaning stage. Conveyance of stock from each of the deaerating chambers 512–516 to the papermaking machine is effected by employment of a plurality of parallel spaced dropleg pipes 552–570 which are connected at one end in air-excluding relationship to the bottom of the deaerating chambers and at the other or outlet end to the back of the headbox 538. As can be noted best from FIG. 15, the closely spaced dropleg pipes 552–570 are arranged parallel with each other and also parallel to the machine axis X–Y. Accordingly, the flow course provided by the dropleg pipes 552–570 has no course deviation therein extending laterally of the machine axis so that the stock issuing from slice 539 of the headbox 538 onto the wire 540 is of optimally uniform character both in respect of fiber distribution as well as flow characteristics thereof.

Figure 6:
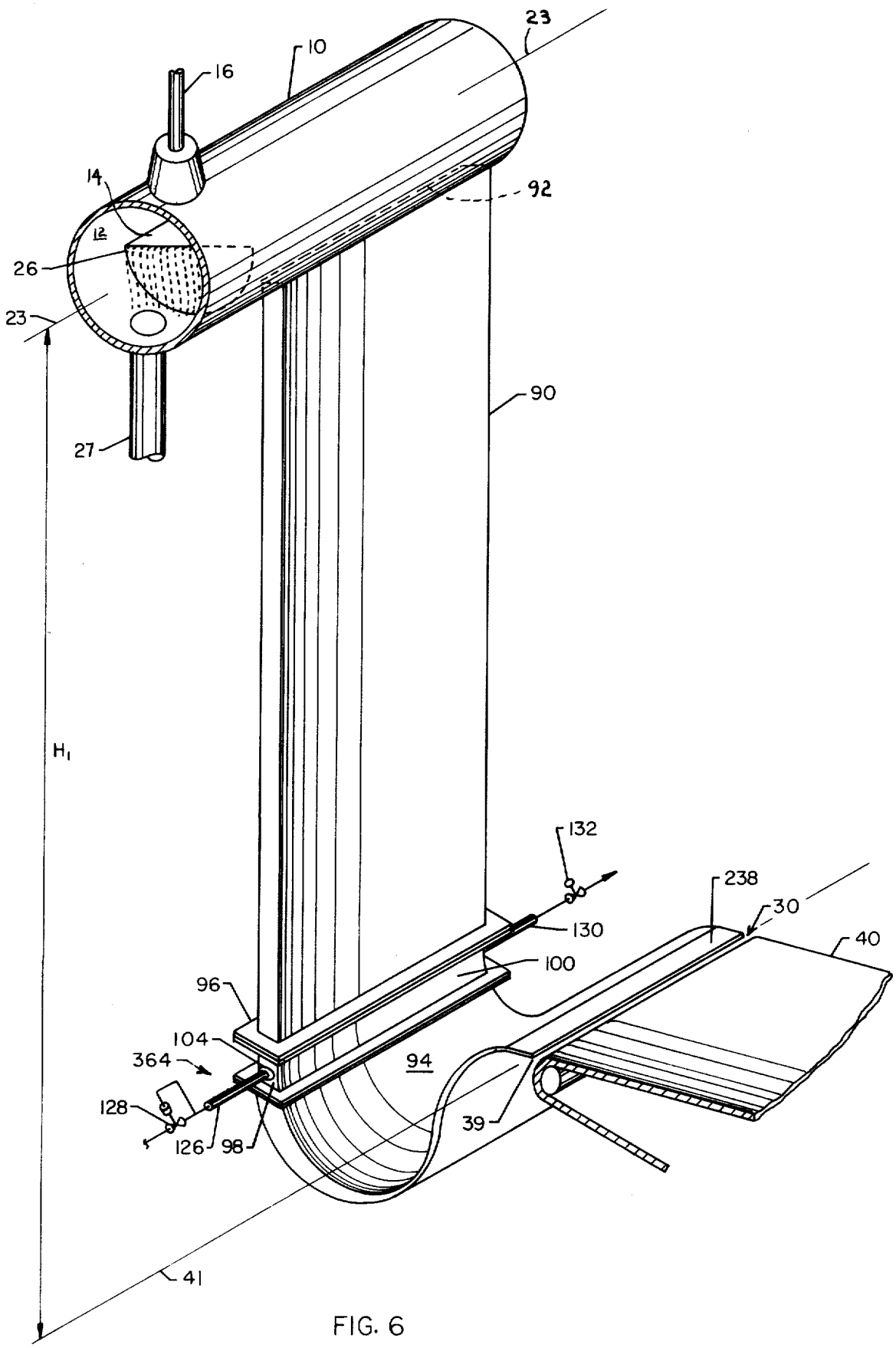
FIG. 6 is a perspective view somewhat similar to FIG. 3, illustrating the dropleg supply conduit means as an enlarged, relatively wide, rectangular chute for effecting gravity transfer of deaerated stock from the receiver means to the web-forming means, the supply conduit means embodying an elongated, selectively expandable and contractable bladder type valve means serving as the papermaker's flow control valve to control stock feed to the web-forming means.

In accordance with the present invention the dropleg supply conduit means communicating papermaking stock from the receiver chamber 12 to the web-forming means 30 need not comprise a plurality of separate supply pipes, such as 52–62 of FIG. 2, but instead may take the form of a single, relatively wide, rectangularly-shaped conduit or chute 90, illustrated by way of example in FIG. 6. It will be noted that the supply conduit or chute 90 has its upper or entry end 92 arranged with its major dimension extending a substantial distance along the length of the bottom of and connected in air-excluding relationship with the stock receiver 10 for communicating the major portion of the lateral expanse of the collecting zone of chamber 12 to the interior of this chute through an elongated, longitudinally-extending slot in the receiver bottom wall. The length of this communicating slot may be substantially equal to the width of chute 90. The lower portion 94 of chute 90 is preferably curved, as shown in FIG. 6, to provide a lateral outlet end section 238 terminating in the wide, transverse, exit slot or slice 39, to define the delivery passage and thus serve as the equivalent of a headbox of web-forming means 30 provided with such exit slice. The criteria indicated above with respect to the critical structural and operational characteristics of the FIG. 2 embodiment are to be satisfied by the modified form of FIG. 6. Thus the dimensions and sizes of the entrance end at 92 of the chute 90, and of cross-sections of the latter at various points between this entrance end and the exit slice 39 are to be so related to the latter, and the height ($H_1$) of the dropleg conduit means provided by the chute is to be such as to assure attainment of the desirable advantageous results indicated above.

Figure 14:
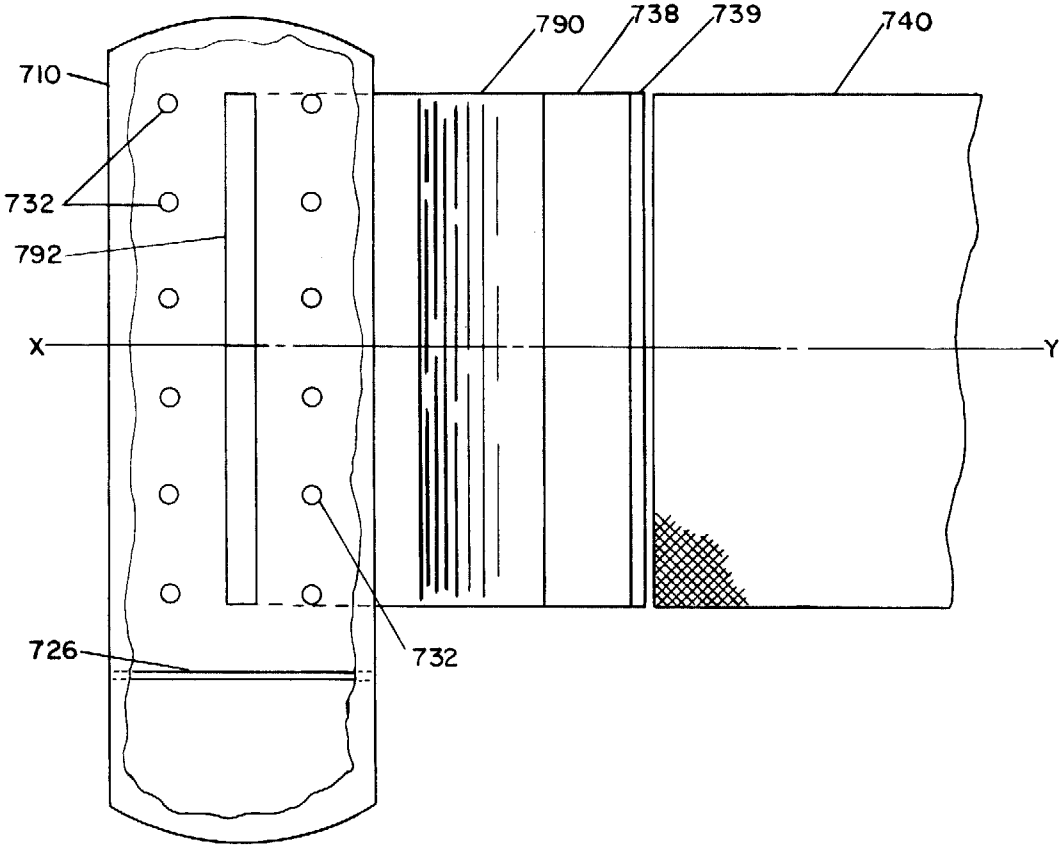
FIG. 14 is a plan view of apparatus similar to that shown in FIG. 6 wherein a single chute conduit is used for conveying stock from the stock receiver to the papermaking machine, the chute conduit being the same width as the papermaking machine headbox outlet slice and being of substantially uniform width from entry to exit ends thereof.

FIG. 14 depicts a preferred form of chute embodiment, wherein the chute 790 is substantially the same width as the web-forming means, that is, the same width as the outlet or slice 739 from whence stock issues out onto the papermaking machine wire 740. The entry 792 to the chute 790 also is substantially the same width as slice 739 as is the chute at its point of connection to the back of the headbox 738 so that the stock conveyed through the chute does not undergo any flow course alteration laterally of the machine axis X–Y. The apparatus of FIG. 14 includes a stock receiver 710 and other features which are the same as that described earlier in connection with FIGS. 1, 2 and 6 with deaerated stock being admitted to the receiver through accepts pipes 732 with the stock receiver being provided with an overflow 726 for the same purpose as described earlier.

The rate of flow through the supply chute 90 similarly is to be subject to control and adjustment by suitable papermaker's valve means, and in selecting or designing such it should be recognized that the transverse dimensions of this chute at a point convenient for mounting such valve means therein may be quite large. Thus papermaker's valves of conventional construction which would perform the desired function could be quite massive both from the standpoint of size and of weight. Moreover, the time required for adjusting or substantially closing the flow passage through such conventional valves of massive size may be quite prolonged. An improved papermaker's valve 364 is thus proposed in FIGS. 6 to 11 inclusive for installation in chute 90. This valve 364 includes a rectangular, hollow box frame 96 having top and bottom openings margined by flange structure to anchor it in fluid-tight manner to opposed sections of the chute 90. This valve frame defines therein between its end panels 98 and side panels 100 a through passage chamber 102 which constitutes a continuation of the flow passage through the chute 90. Within this passage chamber 102 is suitably mounted a selectively expandable and contractable bladder 104 formed of suitable material, such as light gauge sheet metal or flexible plastic, which can be shaped as a tubular shell-like structure extending from end to end of the frame 96, i.e., side to side of the chute 90 in the manner indicated in FIG. 10. As used herein, "tubular" is intended to be understood as including structure of an encircling cross-section without regard to specific geometrical shapes. Thus circular, elliptical and square sectional tubing are to be understood as being suited for use as the bladder 104 as well as other shapes. The end edges 106 of the tubular shell or bladder 104 are in unconstrained, conformable abutment with the inner surfaces 110 of the end panels 98 of the valve frame 96, and in order to provide fluid-tight seals thereat these end edges may be equipped with elastic wiper rings 112, of rubber or other suitable elastic material, which may have wiping lips 114 in continuous sliding contact with the inside surfaces 110. The tubular bladder 104 functions to present a barrier of variable area of confrontation to the stock feed flow through the chute 90, which area can be altered according to the degree to which the bladder is expanded transversely.

Figure 7:
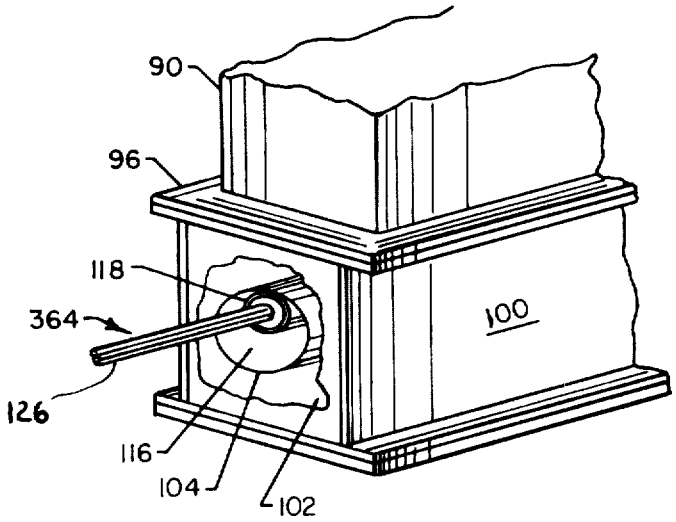
FIGS. 7 and 8 are fragmentary perspective views to larger scale of a section of the supply conduit means shown in FIG. 6 illustrating, respectively, the flow control means bladder in expanded and contracted conditions.
Figure 8:
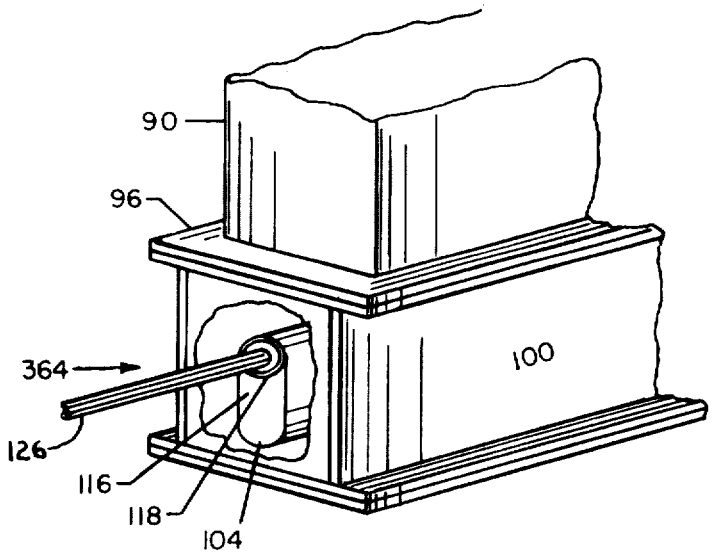
Figure 9:
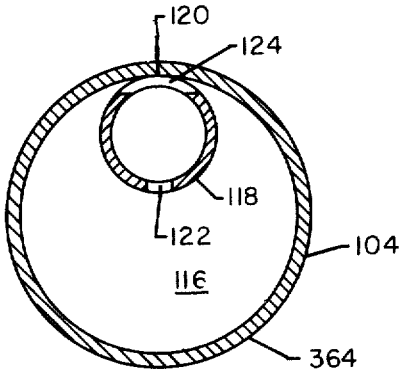
FIG. 9 is an enlarged transverse sectional detail of the valve means bladder shown in FIGS. 7 and 8 in expanded condition.
Figure 10:
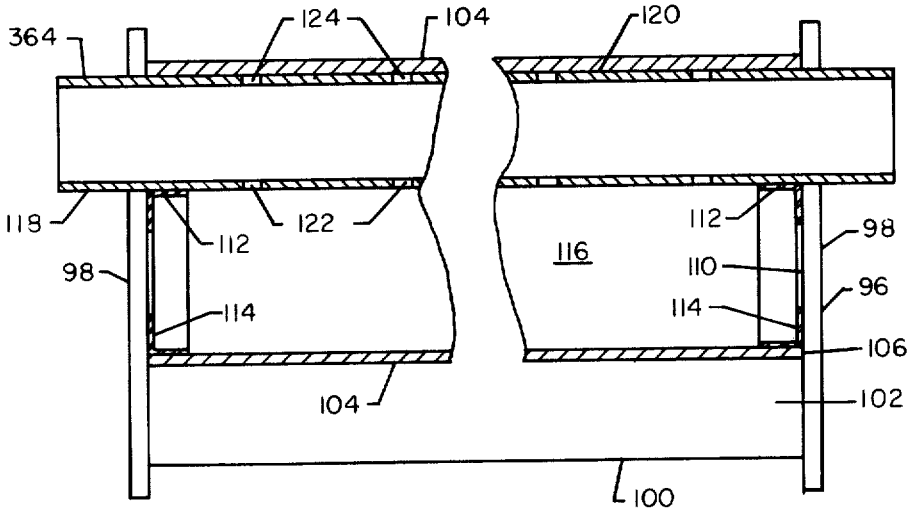
FIG. 10 is a longitudinal vertical sectional view, with parts broken away, of the valve means shown in FIGS. 7 and 8.
Figure 11:
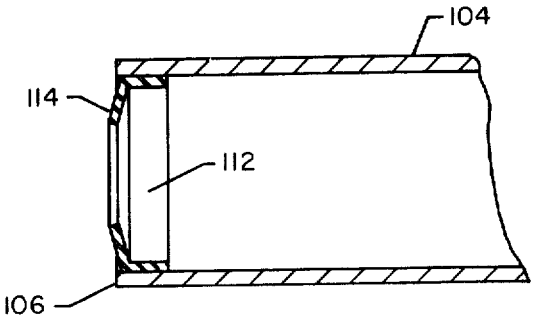
FIG. 11 is a fragmentary sectional view of an end portion of the valve means bladder depicted in FIGS. 6, 7 and 8 showing the manner in which a resilient seal may be affixed thereto for conformably engaging with the inner wall surfaces of the supply conduit to prevent fluid transfer between the interior of the conduit and that of the bladder.

For admitting a pressurized fluid, such as air or suitable liquid, to the chamber 116 within the bladder 104 selectively to expand the latter transversely, a tubular supply conduit or feed pipe 118 extends to communication with this bladder chamber. Preferably the feed pipe 118 extends interiorly through the bladder chamber 116, as is best seen in FIGS. 9 and 10, and passes through both of the frame and walls 98, in fluid-tight manner, to the exterior of these walls. The top side of feed pipe 118 preferably is secured to the top of the inner surface of the bladder 104 along a common longitudinal line 120, in any suitable manner, such as by spot welding or brazing when these feed pipe and bladder are of such metallic materials as to be anchorable by such means. The feed pipe 118 preferably is provided with a number of vents or openings 122, which may be distributed along the bottom longitudinal zone thereof, as is indicated in FIGS. 9 and 10, so that pressurized fluid fed into this pipe may be delivered into the bladder chamber 116 for expanding the bladder 104 to a shape approaching cylindrical form, as indicated in FIG. 7. In such expanded condition the bladder 104 provides appreciable blockage of the flow through the valve passage chamber 102, so as appreciably to constrict the flow passage within the chute 90. By releasing or withdrawing some of the pressurized fluid from the bladder chamber 116, the bladder 104 is permitted to collapse laterally toward the oval shape shown in FIG. 8, under the influence of the flow of stock or furnish through the valve passage chamber 102 which forms a portion of the chute passage. The shape of the bladder 104 depicted in FIG. 8 presents a lesser barrier to the flow of stock through the chute 90. Obviously, by varying the pressure of the fluid admitted into the bladder 104, its shape can be altered between those shown in FIGS. 7 and 8 correspondingly to alter the rate of flow of stock or furnish through this chute.

It may be desired to provide a plurality of longitudinally-spaced, transverse slots 124 extending through the top of the feed pipe 118 to communication with the bladder chamber 116, for bleed of air in the latter into the feed pipe 118 for discharge when there is fluid flow through the latter to the exterior of the valve unit 364. The exterior supply end 126 of the pressurized fluid supply pipe may be equipped with a pressure regulator valve 128, and its exterior discharge end 130 may be provided with a suitable flow control valve 132, which together will control the degree of inflation of the bladder 104, and thus the rate of stock or furnish flow through the chute 90. Preferably, the papermaker's valve 364 will be located in the chute 90 a distance below the level 23 of the surface of the pond 14 of deaerated stock in the collecting zone of the receiver chamber 12 to prevent the existence of any vacuum within the conduit at the location of the valve.

It will thus be understood that in the plural-pipes embodiments of FIGS. 2–5, 12, 13 and 15, and the chute embodiment of FIGS. 6–11 and 14, the supply conduit means is of such construction and arrangement as to have at its upper end entry communication to its through flow course, i.e., its passage or passages as the case may be, from the collecting zone of the receiver chamber along a substantial portion of the major lateral expanse of the bottom portion of the collecting zone. This supply conduit means has exit communication from its flow course with the interior of web-forming means. In any form of the latter there is present an interior delivery passage which terminates in or is provided with a lateral exit slot or slice for delivery therefrom of a flat layer or effluent ribbon of the aqueous stock or furnish to be converted into a paper web upon dewatering or removal of liquid therefrom, such as during travel thereof on the traveling wire of a Fourdrinier unit. In some types of such web-forming means the latter may include a headbox, conventionally identifiable as such, with its interior providing the delivery passage leading to the exit slot or slice, but such usually is characterized by an enlarged interior chamber which receives the deaerated supply stock that is then progressively expelled therefrom by the imposed pressure through the exit slot or slice. However, the production of the desired paper web by apparatus of the present invention does not necessitate the use of an enlarged headbox chamber as the delivery passage leading to the exit slot or slice since, as is indicated in FIG. 6, the lower end of such chute embodiment may provide such delivery passage as a terminal section of the chute flow passage, as the full equivalent of the headbox chamber, for the purpose of advantageous use of the present invention. In either form the unique, dropleg supply conduit means of the present invention, either as a plurality or bank of spaced, dropleg pipes of the FIG. 2 embodiment or the wide chute of the FIG. 6 embodiment which defines a single dropleg passage that is relatively narrow transverse of its width, has exit communication therefrom with a web-forming means delivery passage in a transversely-extending course opposite the major portion of the transverse expanse of the exit slot or slice.

The term "collecting zone" as employed herein is broadly descriptive in character. For example, it is used as meaning at least a portion of the evacuated chamber of the receiver means into which aqueous air-containing papermaking stock is introduced in a manner that facilitates deaeration thereof to convert it to deaerated supply stock which is to be fed to a point of use, e.g., the paper web-forming means of the papermaking apparatus. In some forms of the papermaking apparatus this collecting zone may encompass the whole of the evacuated chamber, and in other forms thereof it may constitute only a portion thereof, with a remaining portion or portions thereof serving other purposes. For example, partition means may be provided in the evacuated chamber to subdivide it into intercommunicated portions, with one serving as the collecting zone source of accepts in a primary cleaning stage in the form of deaerated supply stock for feed to paper web-forming means, another serving as the collecting zone of a secondary cleaning stage for deaerating cleaned rejects from the primary zone for return to the collecting zone of the primary stage, and, if desired, still another serving as the collecting zone of a tertiary or subsequent cleaning stage for deaerating cleaned rejects from the secondary stage for return to the collecting zone of the primary stage or other following stages. It is to be understood that the collecting zone of the primary stage of any such papermaking apparatus does not necessarily provide any appreciable residence of deaerated supply stock to accumulate or pond therein before being withdrawn by the dropleg supply conduit means of the present invention for feed by the latter to the paper web-forming means, and such absence of ponding may characterize the operation or operations in the evacuated chamber portion or portions serving as the collecting zone or zones of the secondary and/or tertiary stages. When there is no appreciable ponding in one or more of such evacuated collecting zones the surfaces of the deaerated aqueous stock that is drawn off or received by droplet supply conduit means connecting thereto may find a level or levels in such supply conduit means below the receiver means as determined by structural characteristics of such supply conduit means and parts of the apparatus which receive the deaerated stock therefrom. Such partition means may comprise known forms of weir means which may dictate by their elevation the levels of the surface of deaerated stock that may pond in such collecting zones adjacent thereto when structural characteristics of the apparatus and the rates of input and output to and from the receiver are such as to dictate appreciable residence of the deaerated stock in the bottoms of these collecting zones, as taught in the identified prior U.S. Kaiser et al. Pat. 3,206,917 and U.S. Kaiser application Ser. No. 526,256, now abandoned. Accordingly, a collecting zone of an evacuated chamber defined by enclosing receiver means of papermaking apparatus embodying features of the present invention pertaining to dropleg supply conduit means may constitute the entire evacuated chamber, or only some structurally delineated portion thereof, in which the deaerated supply stock is deposited for delivery to a point of use by such droplet supply conduit means, whether this deposition develops some ponding in the collecting zone or does not do so.

While the "collecting zone" above described has been discussed herein with respect to its being a space within an evacuated stock receiver, it will be understood that the inventive concept of the novel dropleg conduit means is not limited to use in conjunction with its entry end being connected with an evacuated receiver only. For example, a system may incorporate deaerating means separate from said receiver in which case the already deaerated stock will be delivered to the stock receiver for conveyance therefrom through the dropleg conduit means to the paper web-forming means. Consequently the stock receiver need not be maintained under a condition of vacuum.

From the foregoing it will be discerned that the present invention provides important improvements in the papermaking art. The utilization of dropleg conduit means for connecting the stock receiver with the paper web-forming means results in achievement of even and uniform distribution of fiber and water (uniform stock consistency) in the stock receiver which character of uniform stock consistency is maintained during conveyance of the stock to and out of the paper web-forming means slice. The fact that the flow course defined by the conduit means does not have any flow course deviation therein laterally of the papermaking machine axis provides achievement of the aforementioned desirable ends and overcomes the problems of known forms of supply conduits which, for example, produce unstable flow and distribution conditions when flow therein is displaced laterally of the machine axis as vacuum, e.g., in a cross feed header. Furthermore, where a plurality of dropleg pipes are used as the conduit means, all such pipes are arranged in a flow course parallel with the machine axis and where a single chute conduit is used, it is of uniform width from entry to exit thereof and symmetrical of the machine axis. Furthermore, the lateral expanse of the conduit means in respect of the machine axis is substantially equal to the width of the slice of the papermaking machine headbox and the connection of the conduit means with the stock receiver in the collection shown thereof is along an expanse of the same width substantially as the slice. Additionally, the conduit means of the present invention insures equal distribution of flow across the back of the headbox inlet eliminating the need for recirculation through the headbox header to maintain uniform header pressures. Thus, the need for additional system horsepower expenditure and cleaners as most commonly required in conventional systems is eliminated.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subject matter defined in the following claims:

What is claimed is:

1. In papermaking apparatus comprising papermaking stock receiver means defining an enclosed evacuated chamber having a collecting zone for deaerated aqueous supply stock, and evacuating means associated with said chamber for maintaining its collecting zone under a vacuum sufficient to deaerate aqueous papermaking stock introduced therein, means for introducing aqueous papermaking stock into the collecting zone of said chamber in a manner facilitating deaeration thereof to produce deaerated supply stock therein, a papermaking machine including a forming wire for converting deaerated supply stock into a web of paper, and structure associated with said papermaking machine having an interior delivery passage provided with an exit slot for delivery therefrom in the direction of the papermaking machine axis of an effluent jet of stock onto said wire for conversion into a paper web upon removal of liquid therefrom, the improvement which comprises dropleg supply conduit means defining a flow course communicating said papermaking machine associated structure delivery passage and its exit slot to a bottom portion of the evacuated chamber collecting zone through which deaerated supply stock can be conveyed from said collecting zone to said papermaking machine and comprising a plurality of separate pipes, said pipes being parallel to each other and to said machine axis, said separate pipes each having a longitudinal through flow passage with upper entry ends thereof being connected to said collecting zone bottom portion and arranged in closely spaced array with respect to each other along a substantial part of a major lateral expanse of said collecting zone bottom portion, lower exit ends of said separate pipes being connected with said papermaking machine associated structure delivery passage along a relatively wide course extending transversely of said delivery passage, and being arranged in closely spaced array with respect to each other extending transversely in the direction of the transverse length of said exit slot, the flow course of said pipes between entry thereto and exit therefrom having no flow course deviation therein extending laterally of the axis of the papermaking machine, said receiver means being elevated above said exit slot a sufficient height to overcome the effect of vacuum on gravity outflow of stock from said receiver means, said distance of elevation being additionally such as to provide a stock pressure head sufficient to overcome flow frictional losses in said pipes and said papermaking machine associated structure delivery passage and its exit slot, and flow control means associated with each of said pipes for regulating the rate of flow of deaerated stock therethrough from said chamber collecting zone to said exit sot.

2. The papermaking apparatus of claim 1 wherein said flow control means comprises separate valves located in each of said separate pipes.

3. The papermaking apparatus of claim 2 further comprising valve control means connected with each of said separate valves for operating them in ganged unison.

4. The papermaking apparatus of claim 1, said flow control means being in the form of a plurality of individual units each associated with one of said pipes with each such unit comprising a lower end section of said pipe of certain cross-sectional area and having a bottom end, a feed conduit intervening said exit slot and said lower end section and communicated to the interior of the latter at a point above its bottom end through an opening of lesser cross-sectional area, means defining a flow diverting bypass passage communicated to the interior of said lower end section below the point of communication thereto of said feed conduit, and means limiting the rate of flow through said bypass passage to less than that through said bottom end section above said point of communication thereto of said feed conduit which assures some flow through the latter.

5. The papermaking apparatus of claim 4 wherein said feed conduit is a tubular member having an open-ended initial section sealed to the bottom end of said depending pipe lower end section and extending up into the interior of the latter to the point of communication of the latter with said feed conduit whereby flow into the latter from said depending pipe enters through the tubular member open end.

6. The papermaking apparatus of claim 5 wherein said means limiting the rate of flow through said bypass passage includes adjustable flow regulating means.

7. [The papermaking apparatus of claim 1 wherein said dropleg supply conduit means comprises] *In a papermaking apparatus comprising*

*papermaking stock receiver means defining an enclosed evacuated chamber having a collecting zone for deaerated aqueous supply stock, and evacuating means associated with said chamber for maintaining its collecting zone under a vacuum sufficient to deaerate aqueous papermaking stock introduced therein,*

*means for introducing aqueous papermaking stock into the collecting zone of said chamber in a manner facilitating deaeration thereof to produce deaerated supply stock therein,*

*a papermaking machine including a forming wire for converting deaerated supply stock into a web of paper, and structure associated with said papermaking machine having an interior delivery passage provided with an exit slot for delivery therefrom in the direction of the papermaking machine axis of an effluent jet of stock onto said wire for conversion into a paper web upon removal of liquid therefrom,*

*the improvement which comprises*

*dropleg supply conduit means defining a flow course communicating said papermaking machine associated structure delivery passage and its exit slot to a bottom portion of the evacuated chamber collecting zone through which deaerated supply stock can be conveyed from said collecting zone to said papermaking machine and comprising* a depending and relatively wide chute of rectangular cross-section having the entry end of its passage in the form of an elongated slot extending along a substantial portion of a major lateral expanse of said collecting zone bottom portion and communicating therewith, the exit end of the passage of said chute being arranged with its transverse width extending in the direction of the transverse length of said exit slot and communicating therewith[.], *the flow course of said conduit means between entry thereto and exit therefrom having no flow course deviation therein extending laterally of the axis of the papermaking machine, said receiver means being elevated above said exit slot a sufficient height to overcome the effect of vacuum on gravity outflow of stock from said receiver means, said distance of elevation being additionally such as to provide a stock pressure head sufficient to overcome flow frictional losses in said supply conduit means flow course and said papermaking machine associated structure delivery passage and its exit slot.*

8. The papermaking apparatus of claim 7 wherein said chute is of substantially uniform width between the entry and exit ends thereof.

9. The papermaking apparatus of claim 7 wherein the web-forming path of said papermaking machine wire is disposed horizontally, said exit slot being transversely coextensive with said path, said chute having an upper section which extends downwardly from said stock receiver and a lower end transition section adapted to direct delivery flow of deaerated stock therefrom toward said exit slot.

10. The papermaking apparatus of claim 7 wherein a fluid flow regulating valve is mounted transversely within said chute passage and comprises a selectively expandable and contractable hollow [body] *bladder means* providing a barrier of variable area of confrontation crosswise to fluid flow through said chute passage, means for supplying pressurized fluid connected to said hollow [body,] *bladder means,* and means to regulate admission and withdrawal of the pressurized fluid to the interiof of said hollow [valve body] *bladder means* for selectively expanding and contracting the latter correspondingly to vary the effective flow blocking action of said [valve body] *bladder means.*

11. The papermaking apparatus of claim 10 wherein said [hollow body] *bladder means* is in the form of an elongated bladder having a transversely-extending chamber therein, said pressurized fluid supply means and flow regulating means including a tubular supply conduit extending in a fluid-tight manner through one wall of said chute to within said bladder chamber and having an opening within this chamber communicating said conduit with the latter.

12. The papermaking apparatus of claim [10] *11* wherein outlet passage means having flow regulating means are provided which communicate said bladder chamber to the exterior of said chute for controllably venting the latter.

13. The papermaking apparatus of claim 12 wherein said tubular supply conduit and said outlet passage means are provided as sections of a continuous length of pipe extending through opposite sides of said chute in fluid-tight manner to the exterior of the latter with one exterior section of this pipe serving as a portion of the supply conduit and the other exterior section serving as a portion of the venting outlet passage means, and wherein the intermediate section of said pipe extends through said bladder chamber and is provided with said communicating opening located within the latter.

14. The papermaking apparatus of claim 13 wherein said bladder is a radially flexible tubular shell having openings at opposite ends thereof each defined by surrounding end edge means of said bladder tubular shell with these edge means being in unconstrained, conformable and fluid-tight wiping abutment to the adjacent inner surfaces of said opposite conduit sides.

15. The papermaking apparatus of claim 14 wherein each of said end edge means includes an annular, flexible wiping lip slidably abutted to the opposed inner surface of the adjacent conduit side.

16. The papermaking apparatus of claim 15 wherein said pipe is fixed to the interior surface of said bladder tubular shell along a common longitudinal line of contact therewith.

17. The papermaking apparatus of claim 13 wherein said [hollow valve body constitutes a] bladder *is* in the form of a radially flexible tubular shell having openings at opposite ends thereof each defined by surrounding end edge means of said bladder tubular shell with these edge means being in unconstrained, conformable and fluid-tight wiping abutment to said opposed inside faces of said conduit section.

* * * * *